US010242802B2

(12) United States Patent
Zenzai (10) Patent No.: US 10,242,802 B2
(45) Date of Patent: Mar. 26, 2019

(54) ELECTRONIC COMPONENT WITH AN EXTERNAL ELECTRODE INCLUDING A CONDUCTIVE MATERIAL-CONTAINING RESIN LAYER

(71) Applicant: Murata Manufacturing Co., Ltd., Nagaokakyo-shi, Kyoto-fu (JP)

(72) Inventor: Kota Zenzai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 55 days.

(21) Appl. No.: 15/285,535

(22) Filed: Oct. 5, 2016

(65) Prior Publication Data

US 2017/0103853 A1 Apr. 13, 2017

(30) Foreign Application Priority Data

Oct. 9, 2015 (JP) ................................. 2015-200893
Jul. 29, 2016 (JP) ................................. 2016-149469

(51) Int. Cl.
*H01G 4/248* (2006.01)
*H01G 4/005* (2006.01)
(Continued)

(52) U.S. Cl.
CPC ............. *H01G 4/248* (2013.01); *H01G 4/005* (2013.01); *H01G 4/012* (2013.01); *H01G 4/224* (2013.01);
(Continued)

(58) Field of Classification Search
CPC ...... H01G 4/248; H01G 4/2325; H01G 4/232; H01G 4/012; H01G 4/30; H01G 4/005; H01G 4/224; H01G 4/0085; H01G 4/12
See application file for complete search history.

(56) References Cited

U.S. PATENT DOCUMENTS

2005/0083637 A1* 4/2005 Yoshll .................. H01G 4/2325
361/600
2005/0248908 A1* 11/2005 Dreezen ............... H01G 4/2325
361/306.3
(Continued)

FOREIGN PATENT DOCUMENTS

JP 06-267784 A 9/1994
JP 10-284343 A 10/1998
(Continued)

OTHER PUBLICATIONS

Official Communication issued in Korean Patent Application No. 10-2016-0128840, dated Aug. 30, 2017.
(Continued)

*Primary Examiner* — David M Sinclair
(74) *Attorney, Agent, or Firm* — Keating & Bennett, LLP (57) ABSTRACT

An electronic component body includes an internal electrode that is partially extended to a surface of the electronic component body and is connected to an external electrode including a conductive material-containing resin layer including a conductive material and a resin layer and a plated layer covering the conductive material-containing resin layer. The conductive material-containing resin layer includes metal particles as the conductive material, and the plated layer extends from the surface of the conductive material-containing resin layer into the conductive material-containing resin layer such that the plated layer coats at least some of the metal particles.

19 Claims, 8 Drawing Sheets

(51) Int. Cl.
*H01G 4/224* (2006.01)
*H01G 4/30* (2006.01)
*H01G 4/232* (2006.01)
*H01G 4/012* (2006.01)
*H01G 4/12* (2006.01)
*H01G 4/008* (2006.01)

(52) U.S. Cl.
CPC ........... *H01G 4/232* (2013.01); *H01G 4/2325* (2013.01); *H01G 4/30* (2013.01); *H01G 4/0085* (2013.01); *H01G 4/12* (2013.01)

(56) References Cited

U.S. PATENT DOCUMENTS

| | | | | |
|---|---|---|---|---|
| 2007/0230088 A1* | 10/2007 | Fujimura | ................ | B32B 18/00 |
| | | | | 361/311 |
| 2011/0132637 A1* | 6/2011 | Otani | ...................... | C08L 63/00 |
| | | | | 174/126.1 |
| 2011/0299221 A1* | 12/2011 | Higashi | ................. | H01C 1/142 |
| | | | | 361/305 |
| 2013/0222972 A1* | 8/2013 | Saito | ........................ | H01G 4/30 |
| | | | | 361/301.4 |
| 2014/0063683 A1* | 3/2014 | Gu | ........................... | H01G 4/30 |
| | | | | 361/301.4 |
| 2014/0153156 A1* | 6/2014 | Park | ........................ | H01G 4/30 |
| | | | | 361/303 |
| 2015/0022940 A1* | 1/2015 | Han | ........................ | H01G 4/30 |
| | | | | 361/301.4 |

FOREIGN PATENT DOCUMENTS

| | | | |
|---|---|---|---|
| JP | 2006128385 A | * | 5/2006 |
| JP | 2008-071926 A | | 3/2008 |
| JP | 2011-137128 A | | 7/2011 |
| KR | 10-2015-0013930 A | | 2/2015 |
| WO | 94/10697 A1 | | 5/1994 |

OTHER PUBLICATIONS

Official Communication issued in corresponding Japanese Patent Application No. 2016-149469, dated Jan. 8, 2019.

* cited by examiner

ELECTRONIC COMPONENT WITH AN EXTERNAL ELECTRODE INCLUDING A CONDUCTIVE MATERIAL-CONTAINING RESIN LAYER

CROSS REFERENCE TO RELATED APPLICATIONS

This application claims the benefit of priority to Japanese Patent Application 2016-149469 filed on Jul. 29, 2016 and Japanese Patent Application 2015-200893 filed on Oct. 9, 2015. The entire contents of these applications are hereby incorporated herein by reference.

BACKGROUND OF THE INVENTION

1. Field of the Invention

The present invention relates to an electronic component, and more particularly, an electronic component including an external electrode on a surface of an electronic component body.

2. Description of the Related Art

In recent years, electronic components that have a structure with an external electrode formed on the surface of an electronic component body are widely used as surface-mount (chip-type) electronic components.

Further, as such chip-type electronic components, JP10-284343A proposes a chip-type electronic component as described below.

More specifically, JP10-284343A proposes a chip-type electronic component that has an external electrode including a first electrode layer in contact with the surface of a chip body of ceramic, and a second electrode layer of conductive resin formed to cover the first electrode layer, where the first and second electrode layers are formed to wrap around from an end surface of the chip body to a side surface adjacent to the end surface, and the wrap around length of the first electrode layer is 0.7 times or less as large as the wrap around length of the second electrode layer.

However, in the conventional chip-type electronic component described in JP10-284343A, electrical current will be transmitted to internal electrodes through the conductive particles included in the second electrode layer of conductive resin, thus causing contact resistance between the multiple conductive particles included in the conductive resin layer. Thus, the electronic component has the problem of increasing the resistance value, as compared with chip-type electronic components including external electrodes of baked electrodes formed by integrally baking a conductive paste.

SUMMARY OF THE INVENTION

Preferred embodiments of the present invention provide an electronic component provided on a surface of an electronic component body, with an external electrode including a conductive material-containing resin layer including a conductive material and a resin material, which is excellent in reliability of connection between the external electrode and the electronic component body, and small in resistance value.

An electronic component according to a preferred embodiment of the present invention includes an electronic component body; and an external electrode provided on the surface of the electronic component body, wherein the electronic component body includes an internal electrode that is partially extended to the surface of the electronic component body and is provided to be connected to the external electrode, the external electrode includes a conductive material-containing resin layer including a conductive material and a resin material, and a plated layer covering the conductive material-containing resin layer, the conductive material-containing resin layer includes metal particles as the conductive material, and the plated layer extends from the surface of the conductive material-containing resin layer into an inside of the conductive material-containing resin layer, and coats at least some of the metal particles.

In an electronic component according to a preferred embodiment of the present invention, the plated layer preferably extends into the inside of the conductive material-containing resin layer to a depth of about 60% or greater of the thickness of the conductive material-containing resin layer.

In addition, the metal particles of the conductive material-containing resin layer preferably includes Cu particles, Ag particles, or Cu particles coated with Ag.

Preferably, the plated layer preferably includes a Ni plated layer on the conductive material-containing resin layer, and a Sn plated layer on the Ni plated layer, and the Ni plated layer of the plated layer extends while coating at least some of the metal particles in the conductive material-containing resin layer.

In addition, preferably, the plated layer provided to cover the conductive material-containing resin layer extends through the conductive material-containing resin layer until reaching the electronic component body, and the plated layer is connected to the internal electrode extended to the surface of the electronic component body.

In addition, preferably, the external electrode further includes a base electrode layer of a baked electrode including a glass component and a metal component, the base electrode layer being provided on the electronic component body, the conductive material-containing resin layer is provided on the base electrode layer, and the plated layer covering the conductive material-containing resin layer extends to be connected to the base electrode layer.

In addition, the base electrode layer preferably includes one of Cu and Ni as the metal component.

In an electronic component according to a preferred embodiment of the present invention, the electronic component body includes the internal electrode that is partially extended to the surface of the electronic component body and is provided to be connected to the external electrode, the external electrode includes a conductive material-containing resin layer including a conductive material and a resin layer, and a plated layer provided to cover the conductive material-containing resin layer, the conductive material-containing resin layer includes metal particles as the conductive material, and the plated layer extends from the surface of the conductive material-containing resin layer such that the plated layer coats at least some of the metal particles. Thus, the electronic component makes it possible to reduce the contact resistance between the metal particles, thus making the resistance value smaller, as compared with electronic components simply including plated layers on the surfaces of conductive material-containing resin layers.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Features of the present invention will be described in more detail below with reference to preferred embodiments of the present invention.

It is to be noted that an example of a multilayer ceramic capacitor will be described as an electronic component in preferred embodiments of the present invention.

Figure 1:
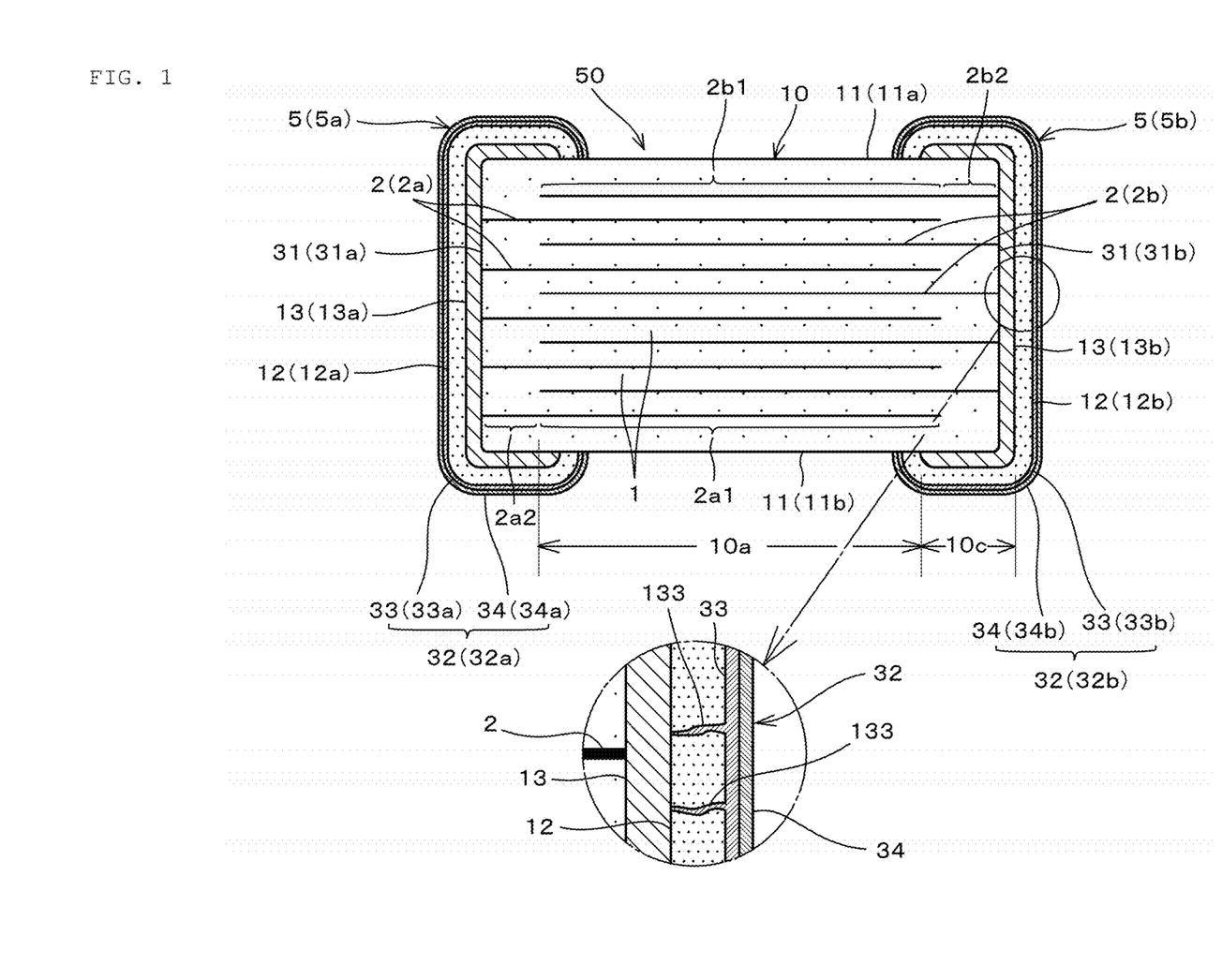
FIG. 1 is a front cross-sectional view illustrating an electronic component (multilayer ceramic capacitor) according to a preferred embodiment of the present invention.
Figure 2:
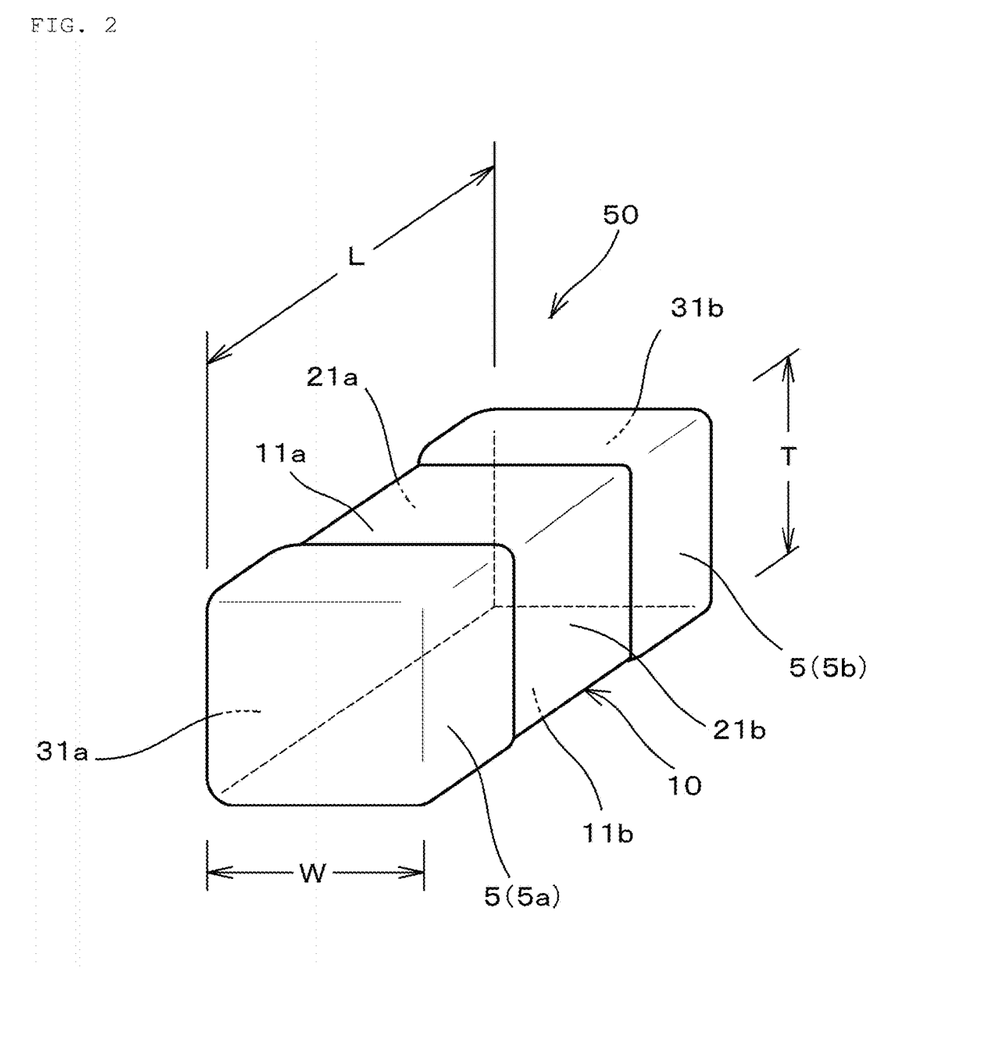
FIG. 2 is a perspective view illustrating a multilayer ceramic capacitor according to a preferred embodiment of the present invention.
Figure 3:
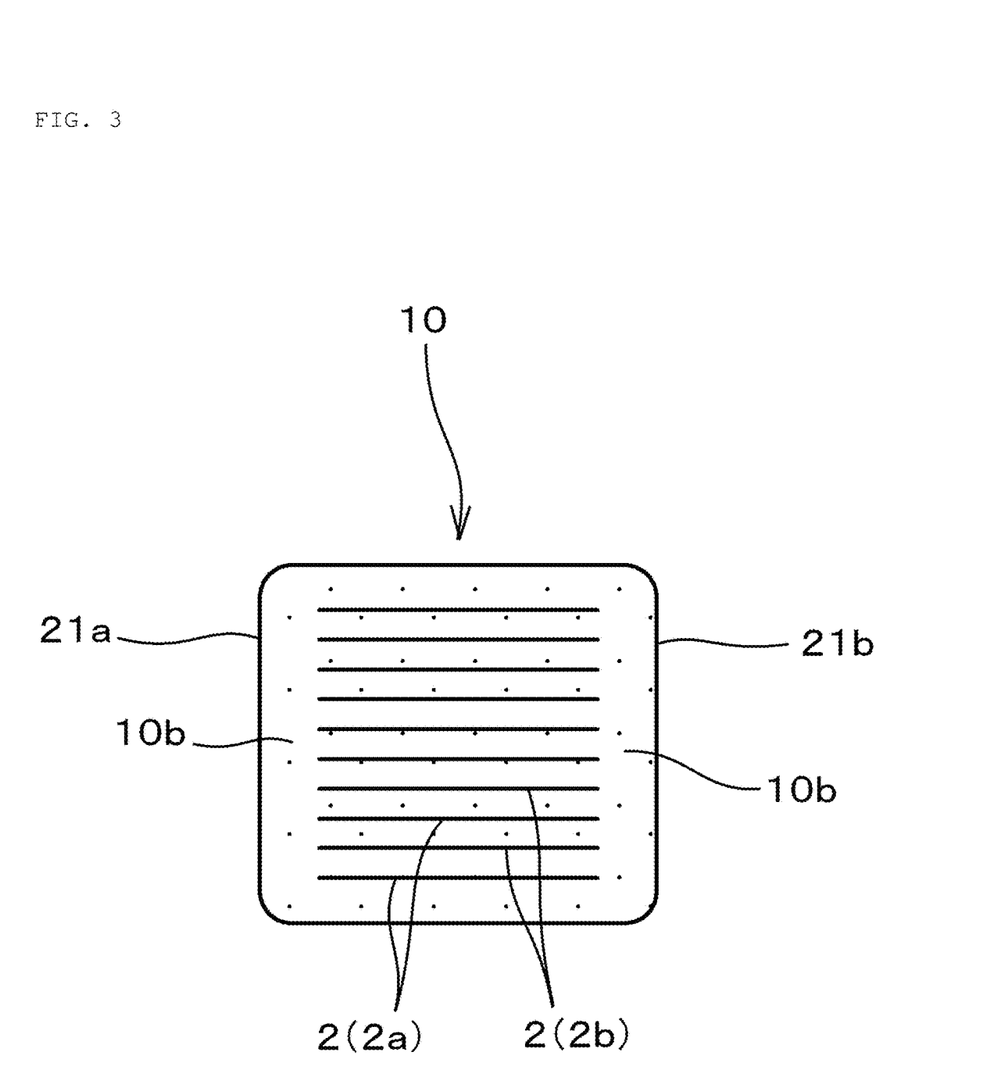
FIG. 3 is a side cross-sectional view of a multilayer ceramic capacitor according to a preferred embodiment of the present invention.

FIG. 1 is a front cross-sectional view illustrating a multilayer ceramic capacitor (electronic component) according to a preferred embodiment (First Preferred Embodiment) according to the present invention, FIG. 2 is a perspective view illustrating the multilayer ceramic capacitor in FIG. 1, and FIG. 3 is a side cross-sectional view.

The multilayer ceramic capacitor 50 preferably is provided, as shown in FIGS. 1 to 3, with an electronic component body 10 of a laminated body including dielectric layers 1 of a dielectric ceramic and multiple internal electrodes 2 (2a, 2b) provided at the multiple interfaces between the dielectric layers 1; and internal electrodes 2 (2a, 2b) and external electrodes 5 (5a, 5b) are provided on the outer surface of the electronic component body 10. The internal electrodes 2a are brought in continuity with the external electrode 5a, whereas the internal electrodes 2b are brought in continuity with the external electrode 5b.

The electronic component body 10 preferably has a cuboid shape as shown in FIG. 1, and includes principal surfaces 11 including a first principal surface 11a and a second principal surface 11b opposed in a T direction in FIG. 2, which is a laminating direction; a first side surface 21a and a second side surface 21b opposed in a W direction in FIG. 2, which is a width direction perpendicular or substantially perpendicular to the laminating direction; and end surfaces 31 including a first end surface 31a and a second end surface 31b opposed in an L (length) direction in FIG. 2, which is a length direction perpendicular to the laminating direction and the width direction. It is to be noted that the electronic component body 10 preferably includes corners and ridges rounded in order to prevent the generation of cracks.

The number of the dielectric layers 1 included in the electronic component body 10 is preferably 100 or more and 600 or less, including outer layers located outside the internal electrodes 2 as upper and lower outermost layers, for example.

In addition, the outer layer of the electronic component body, which includes the dielectric layer 1 located outside of the internal electrode 2 as an outermost layer, is preferably about 10 μm or more and about 30 μm or less in thickness, for example.

For example, a dielectric ceramic including a constituent such as $BaTiO_3$, $CaTiO_3$, $SrTiO_3$, and $CaZrO_3$ can be used as a constituent material of the dielectric layers 1. In addition, these constituents may be used with the addition of a constituent such as a Mn compound, a Fe compound, a Cr compound, a Co compound, and a Ni compound thereto. The dielectric layer 1 is preferably about 0.4 μm or more and about 2.0 μm or less in thickness, for example.

In addition, when the direction of connecting the end surfaces, the direction of connecting the principal surfaces, and the direction of connecting the side surfaces are respectively referred to as the L direction, the T direction, and the W direction, the electronic component body (laminated body) 10 preferably has, for example, including the external electrodes 5 (5a, 5b):

a dimension of about 0.2 mm or more and about 3.2 mm or less in the L direction;

a dimension of about 0.1 mm or more and about 2.5 mm or less in the T direction;

a dimension of about 0.1 mm or more and about 2.5 mm or less in the W direction.

The electronic component body 10 of the multilayer ceramic capacitor 50 according to this preferred embodiment includes, as the multiple internal electrodes 2, first internal electrodes 2a and second internal electrodes 2b as shown in FIG. 1.

The first internal electrodes 2a and the second internal electrodes 2b include, as shown in FIG. 1, opposed electrode portions 2a1, 2b1 that are both regions opposed to each other, and extended electrode portions 2a2, 2b2 that are regions from the opposed electrode portions 2a1, 2b1 to the first end surface 31a and second end surface 31b of the electronic component body 10.

Further, the electronic component body 10 includes, as shown in FIGS. 1 and 3, an opposed portion 10a where the first internal electrodes 2a are opposed to the second internal electrodes 2b, side portions 10b located between the opposed electrode portions 2a1, 2b1 and the first and second side surfaces 21a, 21b of the electronic component body 10, and ends 10c between the opposed portion 10a and the first and second end surfaces 31a, 31b of the electronic component body 10, which include any one of the extended electrode portions 2a2, 2b2 of the first and second internal electrodes 2a, 2b, when the relationship with the internal electrodes 2 is explained.

In addition, for example, Ni, Cu, Ag, Pd, an Ag—Pd alloy, Au, or the like is used as a conductive material of the internal electrodes 2.

In addition, the internal electrodes 2 of the multilayer ceramic capacitor 50 according to this preferred embodiment may include, as a common material, dielectric particles that have substantially the same composition as the ceramic layer.

The number of the internal electrodes 2 laminated is preferably, typically, 20 or more and 400 or less, including the first and second internal electrodes 2a, 2b, for example.

In addition, the internal electrode 2 is preferably, typically, about 0.5 μm or more and about 1 μm or less in thickness, for example.

Furthermore, the proportion of the internal electrodes covering the ceramic layers is preferably, typically, about 70% or more and about 95% or less, for example.

For the multilayer ceramic capacitor 50 according to this present preferred embodiment, the external electrodes 5 (5a, 5b) are provided on the first and second end surfaces 31a, 31b of the electronic component body (laminated body) 10, and wrap around the first and second principal surfaces 11a, 11b and the first and second side surfaces 21a, 21b from the first and second end surfaces 31a, 31b.

The external electrodes 5 (5a, 5b) include base electrode layers 13 of baked electrodes including a glass component and a metal component, which are disposed on the electronic component body 10; conductive material-containing resin layers 12 including a conductive material and a resin layer; and plated layers 32 provided to cover the conductive material-containing resin layers 12. The conductive material-containing resin layer 12a is provided on the base electrode layer 13a, and the plated layer 32a is further provided on the conductive material-containing resin layer 12a. In addition, the conductive material-containing resin layer 12b is provided on the base electrode layer 13b, and the plated layer 32b is further provided on the conductive material-containing resin layer 12b. As just described, when the electronic component body includes the internal electrodes, with the base electrodes provided to electrically connect to the internal electrodes, an electronic component is obtained which has a small resistance value, because the base electrodes are reliably connected to the internal electrodes.

In addition, for example, a component including at least one selected from Cu, Ni, Ag, Pd, an Ag—Pd alloy, Au, and the like is preferably used as the metal component of the base electrode layers 13.

When the base electrode layers include the material mentioned above as the conductive component, it becomes possible to provide an electronic component including external electrodes with high reliability of connection to the internal electrodes, which is preferred.

The base electrode layers 13 can be formed by, for example, applying and baking a conductive paste including a metallic powder and glass frit.

In addition, the base electrode layers 13 may be formed by co-firing together with the internal electrodes 2, and are also able to be formed by applying and baking a conductive paste for base electrode formation, after forming the internal electrodes 2 by firing a laminated body including an internal electrode pattern.

In addition, the thickest portions of the base electrode layers 13 are preferably about 5 μm or more and about 70 μm or less, for example.

In addition, the base electrode layers 13 may have a single-layer structure, or a multilayer structure.

In addition, the conductive material-containing resin layers 12 of the external electrodes include metal particles 14 (FIG. 4) as a conductive material, and include a thermosetting resin as a resin material.

It is desirable, but not necessary, to use Cu or Ag as the metal particles included in the conductive material-containing resin layers 12. It is to be noted that Cu is inexpensive and economically beneficial, but has a tendency to be oxidized. Therefore, on the other hand, Cu has the feature of being likely to decrease the ESR by extension of plated films into the conductive material-containing resin layers due to ingress of a plating solution in a plating step for forming the plated film. More specifically, appropriately extending the plated layers with the use of Cu particles as the metal particles in the conductive material-containing resin layers 12 makes it possible to coat at least a portion of the surfaces of the Cu particles with the plated layers, thus lowering the ESR. It is to be noted that, as the metal particles, Ag particles or Cu particles coated with Ag may be used.

In addition, the metal particles are preferably about 1.0 μm or more and about 10 μm or less in size, for example.

In addition, the content ratio of the metal particles included in the conductive material-containing resin layers 12 is, although described in detail layer, preferably about 83 weight % or more and about 93 weight % or less, for example.

In addition, a thermosetting resin is preferably used as the resin material included in the conductive material-containing resin layers 12. For example, preferred examples include a resin material of an epoxy resin with a curing agent (phenol), an additive, and a catalyst mixed therein.

In addition, the conductive material-containing resin layers 12 are preferably about 5 μm or more and about 100 μm or less in thickness (the thickness of the thickest portion), for example.

The conductive material-containing resin layers 12 may have a single-layer structure, or a multilayer structure.

In addition, plated layers of two-layer structure including Ni plated layers 33 and Sn plated layers 34 are provided as the plated layers 32 included in the external electrodes 5 in this preferred embodiment. The Sn plated layer 34a is disposed on the Ni plated layer 33a, thus defining the plated layers 32a, whereas the Sn plated layer 34b is disposed on the Ni plated layer 33b, thus defining the plated layer 32b. It is to be noted that the plated layers 32 are preferably cover the entire surfaces of the conductive material-containing resin layers 12.

The plated layers are not limited to the examples described above, but may be any layer including at least one selected from Cu, Ni, Ag, Pd, an Ag—Pd alloy, Au, and the like.

In addition, when the metal particles of the conductive material-containing resin layers 12 are Cu particles in a case where the metal of the plated layers 32 is Au, an Au plating solution for use in the formation of Au plated layers may dissolve the Cu particles, but in such a case, the Au plated layers partially define the metal particles, and the advantageous effects of preferred embodiments of the present invention are thus achieved.

In addition, when the metal included in the plated layers 32 is Ni, whereas the metal particles included in the conductive material-containing resin layers 12 are Cu particles, the Cu particles are partially coated with Ni plated layers, thus making it possible to prevent solder leaching to the metal particles.

The plated layers 32 preferably have a two-layer structure including the Ni plating 33 and the Sn plating 34 as described above, but may have a single-layer structure. The plated layers includes the Ni plated layers, and the Sn plated layers disposed on the Ni plated layers, thus causing the Sn plated layer to provide the external electrodes with improved solderability, and furthermore, the Ni plated layers preferably extend so as to coat at least some of the metal particles in the conductive material-containing resin layer, thus making it possible to prevent solder leaching to the metal particles in the conductive material-containing resin layer, and improving the reliability of connection between the plated layer and the conductive material-containing resin layer.

In addition, the plated layers 32 are preferably about 1.0 μm or more and about 10 μm or less in thickness per layer, for example.

In addition, in the multilayer ceramic capacitor 50 according to this preferred embodiment, the Ni plated layers 33 extend into the conductive material-containing resin layers 12, and extended portions 133 are connected to the base electrode layers (baked electrode layers) 13 while partially coating the surfaces of the metal particles. It is to be noted that the metal particles 14 may be entirely covered with the extended portions 133 of the Ni plated layers.

Figure 8:
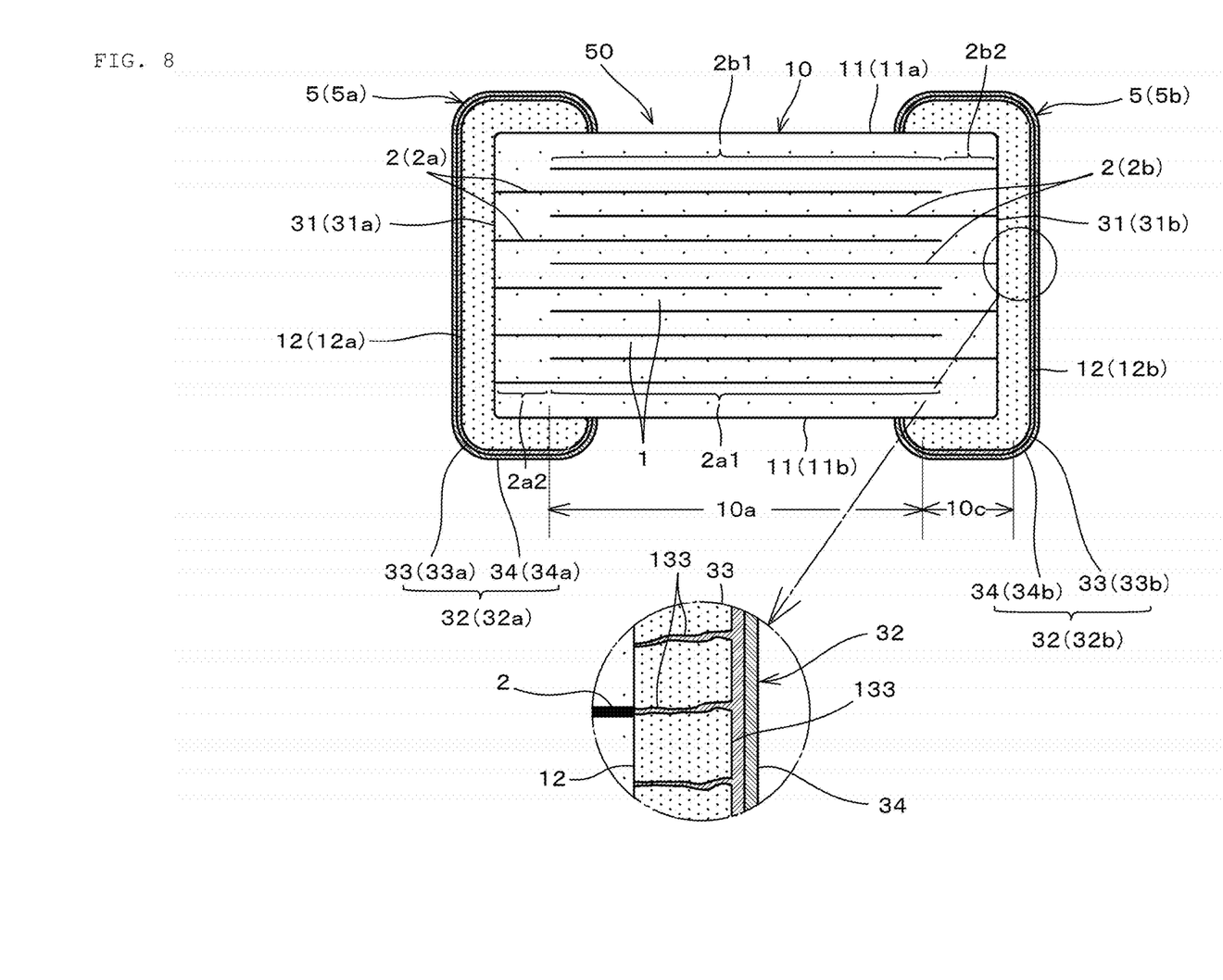
FIG. 8 is a diagram illustrating another example of a multilayer ceramic capacitor according to a preferred embodiment of the present invention.

It is to be noted that as shown in FIG. 8, it is also possible to adopt, as a configuration provided without any base electrode layer, a configuration such that extended portions 133 are connected directly to internal electrodes 2 of a ceramic body 10. Because no base electrode is provided, conductive material-containing layers have only to be provided, thus improving the productivity.

In addition, when the extended portions of plated layers are extended through the conductive material-containing layers to the electronic component body, and connected to the internal electrodes extended at the surface of the electronic component body, an electronic component is obtained which has external electrodes and internal electrodes further reliably connected, and has a small resistance value.

In the case of a configuration including the base electrode layers 13, the base electrode layers 13 entirely cover the end surfaces 31a, 31b of the electronic component body 10, thus making it easy to connect the extended portions 133 of the Ni plated layers 33 extended into the conductive material-containing layers 12, and making it possible to further reduce the resistance value.

It is to be noted that in various preferred embodiments of the present invention, there is not always a need for the extended plated layers to reach the base electrode layers 13 or the internal electrodes 2.

Figure 7:
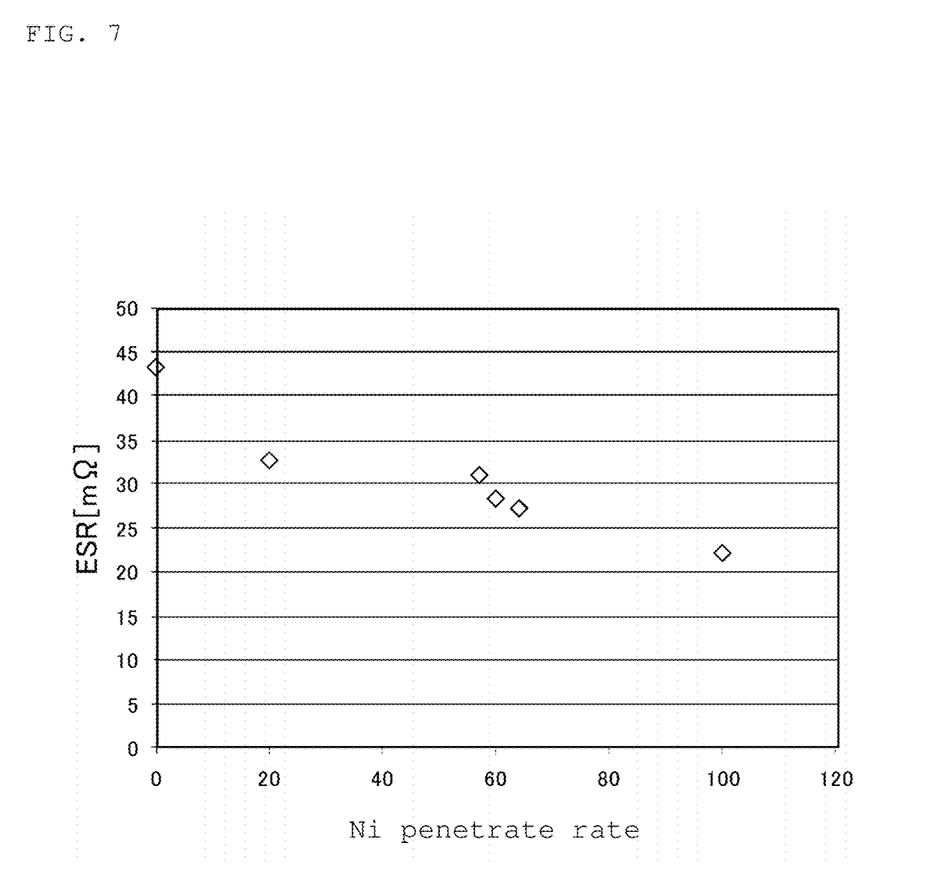
FIG. 7 is a diagram illustrating the relationship between the rate of penetration of the Ni plated layer into a conductive material-containing resin layer and the ESR.

FIG. 7 is a diagram illustrating the relationship between the rate of penetration of the Ni plated layer into the conductive material-containing resin layer and the ESR. The ESR is a value measured at a measurement frequency of 1 MHz. As shown in FIG. 7, the ESR is about 30 mΩ or less when the Ni plated layers 33 are extended to depths of about 60% or more of the thicknesses of the conductive material-containing layers 12, for example, and therefore, favorable continuity reliability can be ensured. More specifically, when the plated layers are extended to depths of about 60% or more of the thicknesses of the conductive material-containing layers, it becomes possible to keeping down the contact resistance between the metal particles, thus further reducing the resistance value.

The thickness of the conductive material-containing resin layer 12 and the magnitude of extension of the plated layer into conductive material-containing resin layer the will be described according to this preferred embodiment of the present invention.

Figure 4:
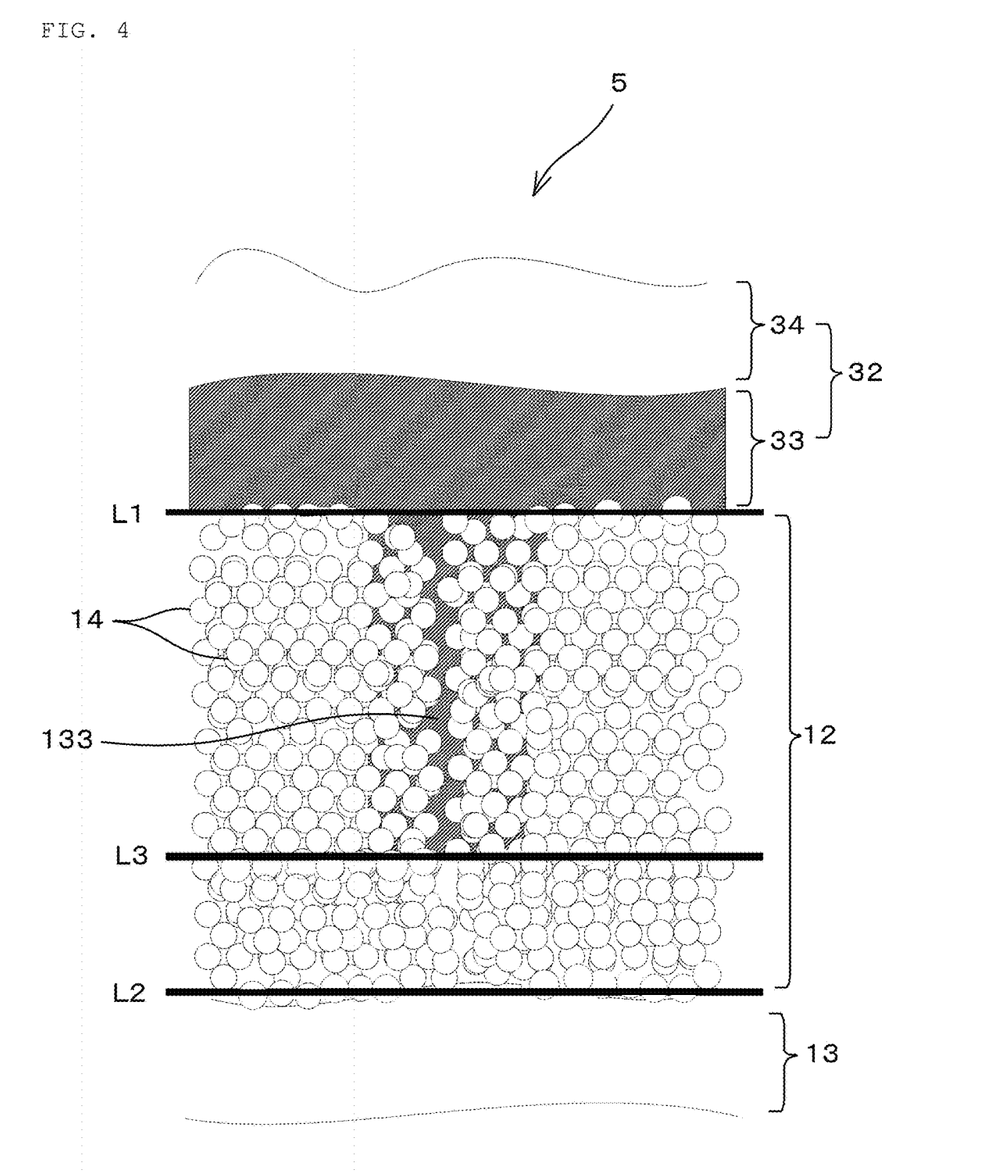
FIG. 4 is a diagram illustrating a multilayer ceramic capacitor according to a preferred embodiment of the present invention, for explaining an extended Ni plated layer and the extension of the Ni plated layer.

As shown in FIG. 4, at a point where the Ni plated layer 133 is allowed to penetrate, a first imaginary line L1 is drawn at the interface between the conductive material-containing resin layer 12 and the Ni plated layer 33, and a second imaginary line L2 is drawn at the interface between the conductive material-containing resin layer 12 and the base electrode layer 13. Then, the distance between the first and second imaginary lines L1, L2 is regarded as the thickness of the conductive material-containing resin layer 12.

In addition, as for the extension of the plated layer into the conductive material-containing resin layer, an imaginary line L3 is drawn parallel to the base electrode layer or the principal surface of the electronic component body in the head position of the deepest extended portion of the plated layer, and the interval between the imaginary line L3 and the imaginary line drawn at the interface between the Ni plated layer and the resin layer is regarded as the extension of the plated layer. It is to be noted that the extension herein refers to the extension achieved when the extended portion 133 does not reach the base electrode layer 13, and when the extended portion 133 of the Ni plated layer 33 is extended to reach the base electrode layer 13, the extension has the same value as the thickness of the conductive material-containing resin layer 12.

It is to be noted that the extension of the plated layer can be confirmed by the following method.

First, the electronic component body 10 is polished so as to expose a cross section in a length L direction and a thickness W direction, thus exposing a cross section of the external electrode. Then, the exposed cross section of the external electrode is subjected to WDX analysis. Then, the extension of the plated layer can be confirmed by analyzing the plated metal component as a target in the WDX as shown in FIG. 6B.

It is to be noted that the extension of the plated layer can be also confirmed by observation with an optical microscope.

In addition, it is possible to determine also the compositions and the like of the plated layer and metal particles by the WDX analysis.

Next, a non-limiting example of a method for manufacturing an electronic component according to a preferred embodiment of the present invention will be described.

For example, a dielectric powder of a BaTiO$_3$ based dielectric ceramic, a powder of additive component, and a solution of binder resin are dispersed and mixed to obtain dielectric slurry.

The dielectric slurry may be based on a solvent or water. When the dielectric slurry is adopted as aqueous slurry, a water-soluble binder or a dispersant may be mixed with a dielectric raw material dispersed in water.

The dielectric slurry is applied in the form of a sheet onto a support film such as a polyethylene terephthalate film, thus forming dielectric green sheets. The dielectric green sheets are intended to define and function as dielectric layers through steps such as stacking and firing.

Then, a material for internal electrode formation is applied by screen printing, gravure printing, or the like onto the dielectric green sheets formed in the way described above, thus forming an internal electrode pattern.

Then, the dielectric green sheets with the internal electrode pattern formed and the dielectric green sheets with no internal electrode pattern formed as dielectric green sheets for outer layers are stacked in a predetermined order to form a dielectric block.

The dielectric block is housed in a mold, and pressed to form a pressure-bonded dielectric block.

This dielectric block is fixed on a cutting table, and divided into individual chips (unfired electronic component bodies). It is to be noted that the division of the dielectric block can be conducted by various methods such as cutting with a cutting blade, cutting with a dicer, or division by laser processing.

The individual electronic component bodies divided are housed in a small-size pot along with polishing media, and the small-size pot is rotated to round corners and ridges of the electronic component bodies. This causes the corners of the electronic component bodies to have a certain radius of curvature, thus inhibiting the generation of cracks.

The unfired electronic component bodies are placed on a setter for firing, and heated to remove, from the electronic component bodies, the organic binder included in the unfired dielectric ceramic layers and internal electrodes (internal electrode pattern). The binder removal step is typically carried out in an air atmosphere, and the atmosphere may be adjusted with the use of $N_2$, $H_2$, $H_2O$, or the like.

Then, carrying out main firing makes the electronic component bodies sintered. It is to be noted that the atmosphere in this case is adjusted by appropriately supplying $N_2$, $H_2$, $H_2O$, or the like. After the firing, sintered electronic component bodies are obtained.

External electrodes are formed on the sintered electronic component bodies, for example, by the method described below.

First, a conductive paste to form base electrode layers of external electrodes is prepared, which includes conductive particles, a resin, and a solvent.

Next, the conductive paste is applied to a table to form a conductive paste layer with a predetermined thickness.

One end surface of the electronic component body where the internal electrodes are exposed is dipped in the conductive paste layer for base electrode layer formation, which is formed on the table, thus providing the conductive paste on the end surface of the electronic component body.

Further, the excess conductive paste covering the end surface may be removed by pressing the end surface covered with the conductive paste against a flat plate with no conductive paste layer formed thereon. In addition, one end surface of the electronic component body may be dipped more than once in the conductive paste layer.

In addition, when the conductive paste excessively spreads out, the electronic component body may be subjected in advance to such a treatment to repel the conductive paste, such that excessive spread out is prevented.

After drying the conductive paste provided on the end surface of the electronic component body, the conductive paste is also applied to the other end surface and dried in the same way. Thereafter, the conductive paste is sintered by baking, thus forming base electrode layers on the both end surfaces of the electronic component body.

However, baking the conductive paste may be carried out at the same time as firing the electronic component body.

The method for forming the base electrode layers is not to be considered limited to the example mentioned above, but it is possible to use other method.

For forming conductive material-containing resin layers, first, a conductive material-containing resin paste is prepared which includes metal particles as a conductive material and a resin material.

Then, the conductive material-containing resin paste is provided by the same method as in the case of the base electrode layers described above, so as to cover the base electrode layers.

Specifically, a conductive material-containing resin paste is prepared which includes: Cu particles or Ag particles as a conductive material; a resin material mixed with an epoxy resin, a curing agent, an additive, and a catalyst; and a solvent, and provided to cover the base electrode layers by a method in accordance with the method for providing the conductive paste for base electrode formation to the electronic component body.

Then, the epoxy resin as a thermosetting resin, which is included in the conductive material-containing resin paste provided, is subjected to thermal curing, thus forming conductive material-containing resin layers.

The temperature for thermally curing the conductive material-containing resin paste preferably is about 150° C. to about 230° C., for example.

The proportion of the metal particles included in the conductive material-containing resin layers is preferably about 83 weight % to about 93 weight %, for example.

When the proportion of the metal particles included in the conductive material-containing resin layers is less than about 83 weight %, the excessively large amount of the resin causes an after-mentioned plating solution to fail to penetrate the conductive material-containing resin layers, thus making it impossible for the metal particles in the conductive material-containing resin layers to be covered with plating, and thus increasing the ESR, which is not preferred.

In addition, when the proportion of the metal particles included in the conductive material-containing resin layers is greater than about 93 weight %, the excessively low proportion of the resin decreases the adhesion strength between the electronic component body and the conductive material-containing resin layers, thus damaging reliability, which is not preferred.

In addition, the proportion of the volume of the metal particles to the volume of the conductive material-containing resin layers is preferably about 40 volume % or more and about 63 volume % or less, for example. It is to be noted that the proportion of the volume of the metal particles to the volume of the conductive material-containing resin layers can be determined from the areal proportions of the metal particles and resin layer by partially polishing a cross section of the external electrode.

In addition, the metal particles is typically a mixture of: a flattened powder in a flattened shape like a crushed spherical shape; and a spherical metal powder, and when the proportion of the flattened powder is increased, cavities are likely to be produced in the conductive material-containing resin layers, and the plating solution penetrates the cavities, thus making it easy to form extended portions. However, when the flattened powder is excessively increased, the proportion of cavities in the conductive material-containing resin layers is increased, and there is thus a possibility of leading unfavorable circumstances. Therefore, the proportion of the flattened powder to the metal particles is preferably determined in consideration of the type of the metal powder and the composition of the plating solution.

Next, plated layers are formed on the surfaces of the conductive material-containing resin layers formed on the electronic component body as described above.

To form the plated layers, the electronic component body with the conductive material-containing resin layers formed and conductive media are put in a plating tank with a Ni plating solution therein, and current is applied through the conductive media to the surfaces of the conductive material-containing resin layers formed on the electronic component body, thus depositing Ni plated layers on the surfaces of the conductive material-containing resin layers.

In this regard, the Ni plating solution penetrates near the base electrode layers by passage between the metal particles in the conductive material-containing resin layers, thus depositing the Ni plated layers on the surfaces of the metal particles. The Ni plated layers reliably connect the external electrodes and the internal electrodes through the conductive material-containing resin layers and the base electrodes, thus improving the continuity and lowering the ESR.

Then, Sn plated layers are further formed on the Ni plated layers formed on the surfaces of the conductive material-containing resin layers. To form the Sn plated layers, the conductive component body with the Ni plated layers formed and conductive media are put in a plating tank with a Sn plating solution therein, and current is applied through the conductive media to the surfaces of the Ni plated layers, thus depositing Sn plated layers on the surfaces of the Ni plated layers.

Thus, a multilayer ceramic capacitor is obtained which has a structure as shown in FIG. 1.

A multilayer ceramic capacitor (sample for comparison) with Ni plated layers not extended in conductive material-containing resin layers, and a multilayer ceramic capacitor 50 (FIG. 1) with Ni plated layers extended in conductive material-containing resin layers as described above according to a preferred embodiment of the present invention were prepared, left for 500 hours in a high-temperature atmosphere at 175° C., and then subjected to equivalent series resistance (ESR) measurement. The results are shown in FIG. 5.

Figure 6A:
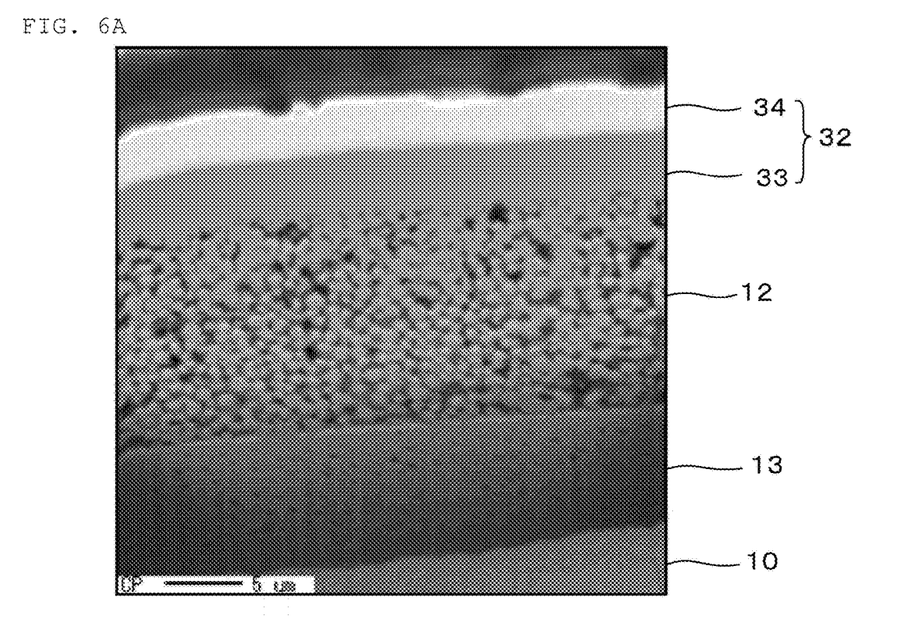
FIGS. 6A and 6B are respectively a SEM image and a WDX image showing an external electrode with a plated layer extended, in a multilayer ceramic capacitor according to a preferred embodiment of the present invention.
Figure 6B:
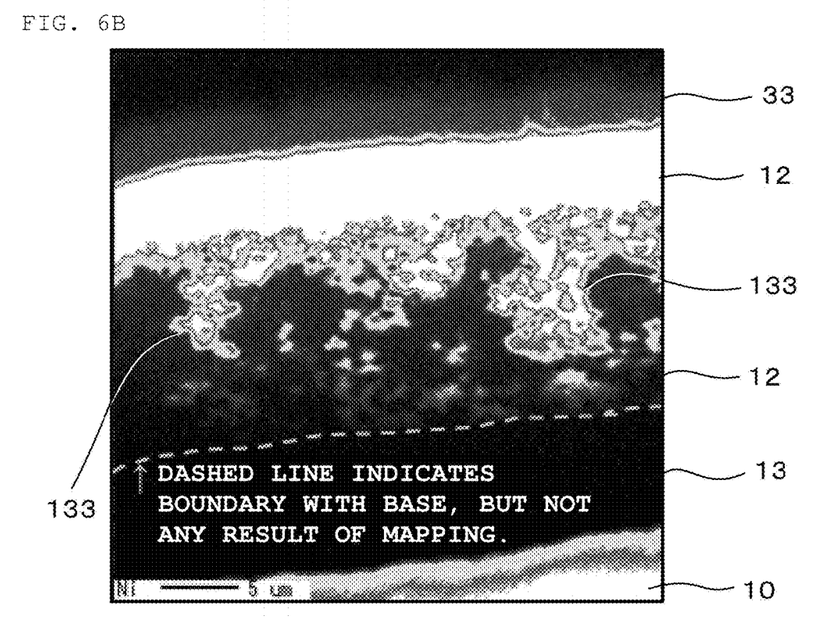

FIGS. 6A and 6B are respectively a SEM image and a WDX image showing major portion of an external electrode with a plated layer extended, in the multilayer ceramic capacitor (sample).

Figure 5:
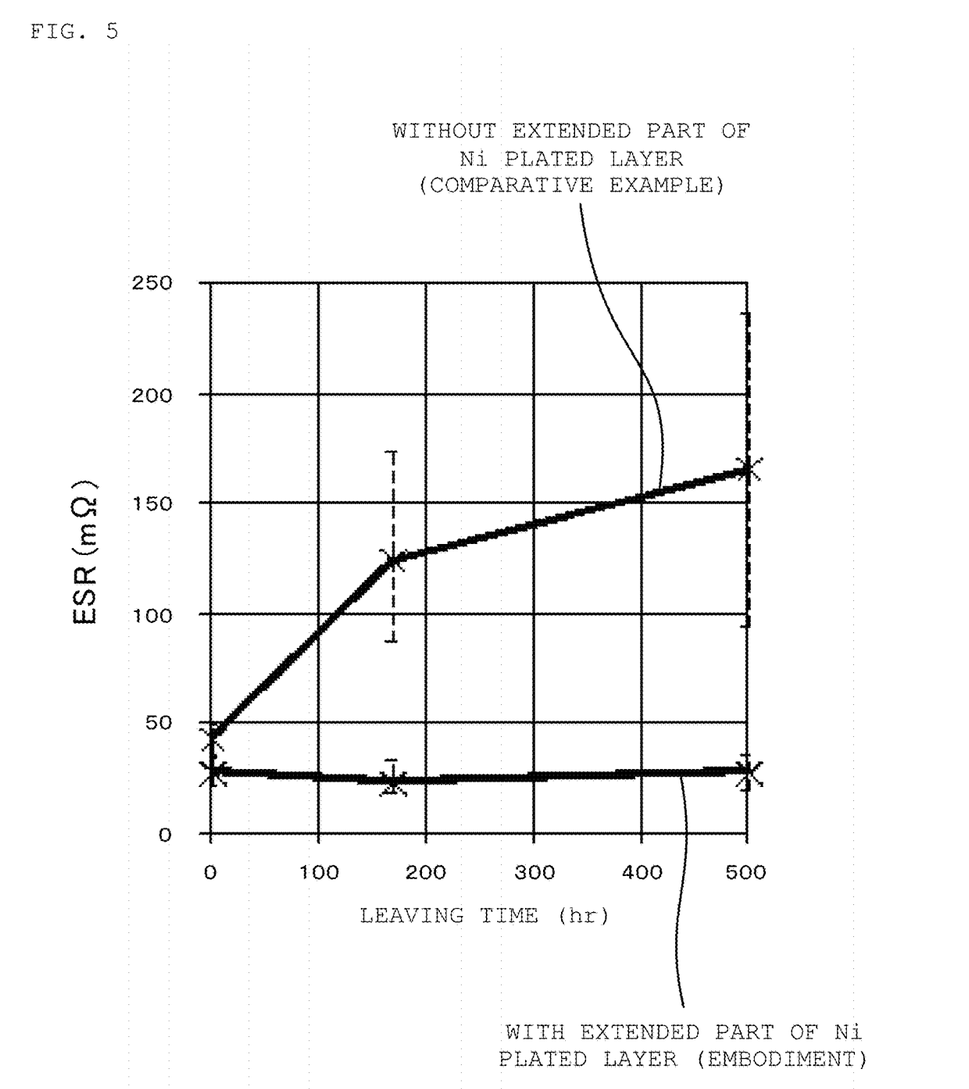
FIG. 5 is a diagram showing behaviors of equivalent series resistance (ESR) in a high-temperature atmosphere for a multilayer ceramic capacitor according to a preferred embodiment of the present invention and a multilayer ceramic capacitor for comparison.

As shown in FIG. 5, the ESR tends to increase with time in the case of the multilayer ceramic capacitor for comparison without any extended portion formed from Ni plated layers extended in the conductive material-containing resin layers, no increase in ESR occurs at all while in the case of the multilayer ceramic capacitor (see FIG. 6) according to a preferred embodiment of the present invention. From the foregoing result, it has been confirmed that extending the Ni plated layers in the conductive material-containing resin layers significantly reduces or prevents the increase in equivalent series resistance (ESR) due to oxidation/chloridation/sulfurization of the metal powder or expansion of the resin, even in the case of exposure to high-temperature atmospheres.

It is to be noted that while examples of the multilayer ceramic capacitor including the base electrode layers have been described in the preferred embodiments, electronic components according to various preferred embodiments of the present invention is able to be configured to include no base electrode layer. In the case of a configuration including no base electrode layer, sufficiently extending extended portions of plated layers makes it possible to obtain a multilayer ceramic capacitor where the extended portions are connected directly to internal electrodes.

In addition, while examples of multilayer ceramic capacitors have been described as the electronic component in preferred embodiments of the present invention, the present invention is not limited to multilayer ceramic capacitors, but it is possible to apply preferred embodiments of the present invention to various electronic components including external electrodes on the surface of a ceramic body, such as multilayer electronic components, e.g., multilayer coils, multilayer varistors, multilayer LC composite components, and non-multilayer chip resistors, and chip thermistors.

In addition, preferred embodiments of the present invention can be applied not only in the case of electronic component bodies including internal electrodes, as with multilayer ceramic capacitors, but also in the case of including no internal electrode (for example, chip resistors and chip thermistors).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
    an electronic component body; and
    an external electrode provided on a surface of the electronic component body; wherein
    the electronic component body includes an internal electrode that is partially extended to the surface of the electronic component body and is provided to be connected to the external electrode;
    the external electrode includes a conductive material-containing resin layer including a conductive material and a resin material, and a plated layer covering the conductive material-containing resin layer;
    the conductive material-containing resin layer includes metal particles as the conductive material;
    the metal particles include a mixture of flattened powder in a flattened shape and a spherical metal powder;
    a proportion of a volume of the metal particles to a volume of the conductive material-containing resin layer is about 40 volume % or more and about 63 volume % or less;
    the plated layer extends from a surface of the conductive material-containing resin layer into an inside of the conductive material-containing resin layer, and coats at least some of the metal particles; and
    the plated layer extends into the inside of the conductive material-containing resin layer to a depth of about 60% or greater of a thickness of the conductive material-containing resin layer.

2. The electronic component according to claim 1, wherein the metal particles of the conductive material-containing resin layer includes at least one of Cu particles, Ag particles, and Cu particles coated with Ag.

3. The electronic component according to claim 1, wherein
    the plated layer includes a Ni plated layer on the conductive material-containing resin layer, and a Sn plated layer on the Ni plated layer; and
    the Ni plated layer of the plated layer extends while coating at least some of the metal particles in the conductive material-containing resin layer.

4. The electronic component according to claim 1, wherein
    the plated layer extends through the conductive material-containing resin layer until reaching the electronic component body; and
    the plated layer is connected to the internal electrode extended to the surface of the electronic component body.

5. The electronic component according to claim 1, wherein
    the external electrode includes a base electrode layer of a baked electrode including a glass component and a metal component;
    the base electrode layer is located on the electronic component body;
    the conductive material-containing resin layer is located on the base electrode layer; and the plated layer covering the conductive material-containing resin layer extends to be connected to the base electrode layer.

6. The electronic component according to claim 5, wherein the base electrode layer includes one of Cu and Ni as the metal component.

7. The electronic component according to claim 5, wherein a thickest portion of the base electrode layer is about 5 µm or more and about 70 µm or less.

8. The electronic component according to claim 5, wherein the base electrode layer has one of a single-layer structure and a multilayer structure.

9. The electronic component according to claim 1, wherein the electronic component is a multilayer ceramic capacitor.

10. The electronic component according to claim 9, wherein an outer layer of the multilayer ceramic capacitor has a thickness of about 10 µm or more and about 30 µm.

11. The electronic component according to claim 9, wherein the multilayer ceramic capacitor includes a plurality of dielectric layers each with a thickness of about 0.4 µm or more and about 2.0 µm or less.

12. The electronic component according to claim 1, wherein the electronic component body has a dimension of about 0.2 mm or more and about 3.2 mm or less in a length direction, a dimension of about 0.1 mm or more and about 2.5 mm or less in a thickness direction, a dimension of about 0.1 mm or more and about 2.5 mm or less in a width direction.

13. The electronic component according to claim 1, wherein the internal electrode has a thickness of about 0.5 µm or more and about 1 µm or less.

14. The electronic component according to claim 1, wherein the electronic component is a multilayer ceramic capacitor including a plurality of internal electrodes and a plurality of ceramic layers, and a portion of the internal electrodes covering the ceramic layers is about 70% or more and about 95% or less.

15. The electronic component according to claim 1, wherein the resin material is a thermosetting resin material.

16. The electronic component according to claim 1, wherein the metal particles are about 1.0 µm or more and about 10 µm or less in size.

17. The electronic component according to claim 1, wherein a content ratio of the metal particles included in the conductive material-containing resin layer is about 83 weight % or more and about 93 weight % or less.

18. The electronic component according to claim 1, wherein the conductive material-containing resin layer is about 5 µm or more and about 100 µm or less in thickness.

19. The electronic component according to claim 1, wherein the conductive material-containing resin layer has one of a single-layer structure and a multilayer structure.

* * * * *